US008903096B2

(12) United States Patent
Chittigala et al.

(10) Patent No.: US 8,903,096 B2
(45) Date of Patent: Dec. 2, 2014

(54) SECURITY KEY DISTRIBUTION IN A CLUSTER

(75) Inventors: Jes Kiran Chittigala, Hyderabad (IN); Ravi A. Shankar, Austin, TX (US); Vidya Ranganathan, Bangalor (IN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/556,398

(22) Filed: Jul. 24, 2012

(65) Prior Publication Data

US 2012/0288096 A1      Nov. 15, 2012

Related U.S. Application Data

(63) Continuation of application No. 13/092,318, filed on Apr. 22, 2011.

(51) Int. Cl.
*H04L 29/06*      (2006.01)
*H04L 9/08*       (2006.01)

(52) U.S. Cl.
CPC ............ *H04L 9/0825* (2013.01); *H04L 63/045* (2013.01)
USPC .............. 380/282; 380/44; 380/255; 380/283; 726/10; 726/25; 709/206; 713/163; 713/189

(58) Field of Classification Search
USPC ........................................................ 380/282
See application file for complete search history.

(56) References Cited

U.S. PATENT DOCUMENTS

| | | | |
|---|---|---|---|
| 7,660,983 B1 * | 2/2010 | Srivastava et al. ............ | 713/163 |
| 7,689,822 B2 | 3/2010 | Maggenti et al. | |
| 7,860,243 B2 * | 12/2010 | Zheng et al. .................... | 380/30 |
| 2002/0138722 A1 * | 9/2002 | Douceur et al. ............... | 713/153 |
| 2007/0076889 A1 * | 4/2007 | DeRobertis et al. ........... | 380/279 |
| 2008/0075280 A1 * | 3/2008 | Ye et al. .......................... | 380/44 |
| 2009/0193267 A1 * | 7/2009 | Chung .......................... | 713/193 |
| 2010/0095118 A1 * | 4/2010 | Meka ............................. | 713/168 |
| 2010/0106972 A1 | 4/2010 | Melen et al. | |
| 2013/0013931 A1 * | 1/2013 | O'Hare et al. ................. | 713/189 |

FOREIGN PATENT DOCUMENTS

| | | |
|---|---|---|
| CN | 101741566 | 12/2009 |
| KR | 2008046392 | 11/2006 |

OTHER PUBLICATIONS

An improved key distribution mechanism|http://nslab.kaist.ac.kr/courses/2009/cs712/paperlist/2-22.pdf|Cheng et al.|2006|pp. 1-14.*
Fang et al., "A Chaos-Based Secure Cluster Protocol for Wireless Sensor Networks," Kybernetika, V. 44, pp. 522-533, Czech Republic, 2008.

(Continued)

*Primary Examiner* — Mahfuzur Rahman
(74) *Attorney, Agent, or Firm* — John D. Flynn; Gregory K. Goshorn; Greg Goshorn, P.C.

(57) ABSTRACT

Provided are techniques for the fast and reliable distribution of security keys within a cluster of computing devices, or computers. One embodiment provides a method for secure distribution of encryption keys, comprising generating a symmetric key for the encryption of communication among a plurality of nodes of a cluster of nodes; encrypting the symmetric key with a plurality of public keys, each public key corresponding to a particular node of the plurality of modes, to generate a plurality of encrypted symmetric keys; storing the plurality of encrypted symmetric keys in a central repository; and distributing the encrypted symmetric keys to the nodes such that each particular node receives an encrypted symmetric key corresponding to a corresponding public key of the particular node.

21 Claims, 6 Drawing Sheets

(56) References Cited

OTHER PUBLICATIONS

Zhu et al., "SNARE: A Strong Security Scheme for Network-Attached Storage," Proceedings of the 22nd International Symposium on Reliable Distributed Systems, IEEE, , pp. 1-10, 2003.
Dimitriou et al., "Fast and Scalable Key Establishment in Sensor Networks," Athens Information Technology, pp. 1-31, 2003-2004.
"Enterprose Key Management," BITS Security Working Group, pp. 1-24, May 2008.
Nika-Rotara, "High-Performance Secure Group Communication," John Hopkins University, pp. 1-146, Jun. 2003.
Poovendran et al., "A Scalable Extension of Group Key Management Protocol," Center for Satellite and Hybrid Communication Networks, pp. 1-5., 1998.
Santhi et al., "Scalable Dynamic Key Based Group Key Management System," IJCSNS International Journal of Computer Science and Network Security, V. 10, pp. 106-110, No. 9, Sep. 2010.

* cited by examiner

SECURITY KEY DISTRIBUTION IN A CLUSTER

CROSS-REFERENCES TO RELATED APPLICATIONS

The present application is a continuation and claims the benefit of the filing date of an application entitled, "Security Key Distribution Cluster" Ser. No. 13/092,318, filed Apr. 22, 2011, assigned to the assignee of the present application, and herein incorporated by reference.

BACKGROUND OF THE INVENTION

The claimed subject matter relates generally to computer security and, more specifically, to a fast, reliable technique for the distribution of a security key.

One technique employed to connect computers is the formation of networks such as a local area network (LAN). Another technique is the formation of "clusters." A cluster is a grouping of computers that work together and that may, but not necessarily, communicate over a network such as a LAN or the Internet. Each computer within a cluster is referred to as a "node." Clusters may be implemented to provide such functionality as computing redundancy, load balancing and increased computing power.

Within a cluster, nodes communicate with each other for various reasons such as, but not limited to, node availability, message exchange and event details. In the event a communication medium is not trusted, such communication may need to be secured. One method for providing such security is the distribution of symmetric keys among the nodes. However, issues arise with respect to the secure distribution of keys over an unsecure network.

SUMMARY

Provided are techniques for the fast and reliable distribution of security keys within a cluster of computing devices, or computers. In parallel with the increasing number of computing devices is the establishment of connections between the computers. Connections may be established so that different devices may share peripheral devices such as printers and computer readable storage media (CRSM). Computers are also connected to improve performance and availability over that of a single computer.

One embodiment provides a method for secure distribution of encryption keys, comprising generating a symmetric key for the encryption of communication among a plurality of nodes of a cluster of nodes; encrypting the symmetric key with a plurality of public keys, each public key corresponding to a particular node of the plurality of modes, to generate a plurality of encrypted symmetric keys; storing the plurality of encrypted symmetric keys in a central repository; and distributing the encrypted symmetric keys to the nodes such that each particular node receives an encrypted symmetric key corresponding to a corresponding public key of the particular node.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
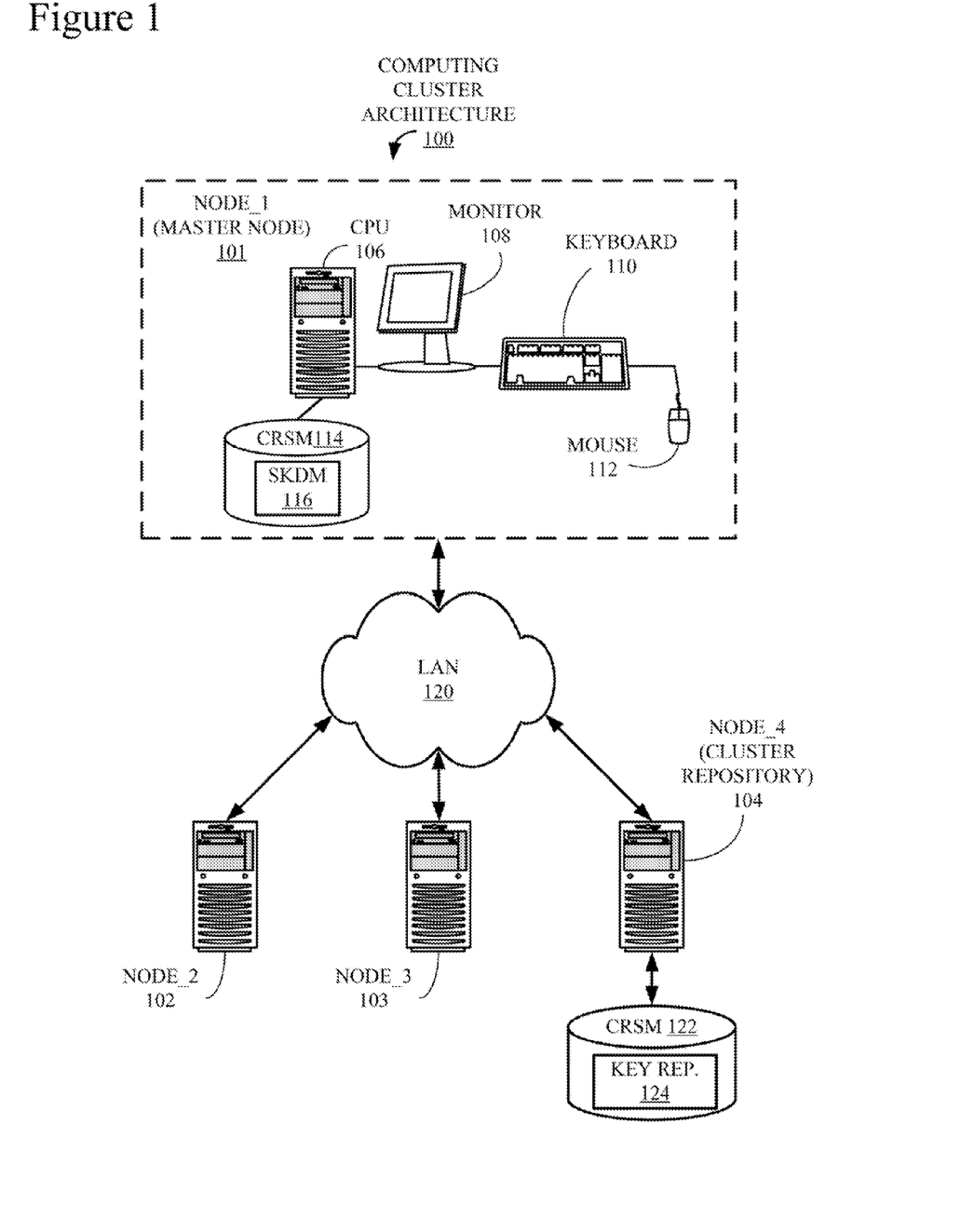
FIG. 1 is a block diagram of a cluster computing architecture that may implement the claimed subject matter.

FIG. 1 is a block diagram of a computing cluster 100 that may implement the claimed subject matter. Cluster 100 includes four computing devices, or "nodes," i.e. a node_1 101, a node_2 102, a node_3 103 and a node_4 104. In the following description, specific types of computing tasks executed by each of nodes 101-104 are not necessarily detailed. However, those with skill in the relevant arts will appreciate that there are many types of computing devices and associated functions that may be configured into a cluster type of architecture including, but not limited to, file servers, application servers, printers, storage area networks (SANs) and so on.

In this example, node_1 101 is also referred to as the "master node" and includes a central processing unit (CPU), or "processor," 106, a monitor 108, a keyboard 110 and a pointing device, or "mouse," 112. Monitor 108, keyboard 110 and mouse 112 enable human interaction with node_1 101 and other components of cluster 100. Communicatively coupled to CPU 106 is a computer readable storage medium (CRSM) 114, which may either be incorporated into node_1 101 i.e. an internal device, or attached externally to node_1 101 by means of various, commonly available connection devices such as but not limited to, a universal serial bus (USB) port (not shown). CRSM 114 is illustrated storing a example of a secure key distribution module (SKDM) 116 that may implement aspects of the claimed subject matter. Although not illustrated, like node_1 101, nodes 102-104 would also typically include a CPU, monitor, keyboard, mouse and CRSM.

In the following examples, node_4 104 is also referred to as the "cluster repository." A CRSM 122, which stores a key repository (rep.) 124, is communicatively coupled to node_4 104. Cluster 100 and nodes 101-104 are connected to a local area network (LAN) 120. Although in this example, cluster 100 and nodes 101-104 are communicatively coupled via LAN 120, they could also be coupled through any number and combination of communication mediums such as, but not limited to, the Internet (not shown) and direct wired connections.

The roles of master node 101, SKDM 116, cluster repository 104 and key repository 124 are explained in more detail below in conjunction with FIGS. 2-5. The actual designation of a "master" node is simply for convenience; each of nodes 101-104 may implement a copy of SKDM 116 such that if the master node is unavailable another node may become the "Master" and implement the disclosed techniques. This particular aspect of the claimed subject matter is explained in more detail below in conjunction with FIGS. 3-5. Further, it should be noted there are many possible cluster configurations, of which cluster 100 is only one simple example.

Figure 2:
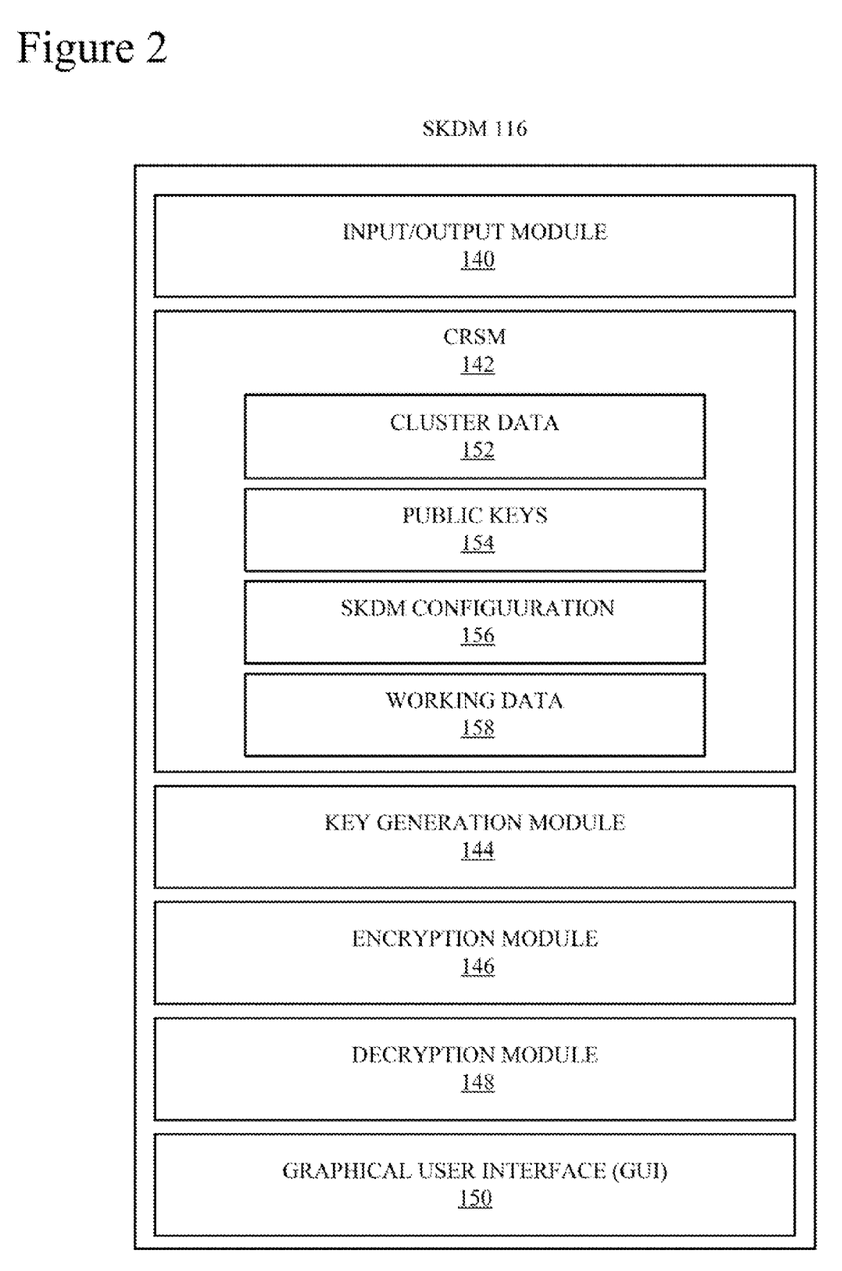
FIG. 2 is a block diagram of a Secure Key Distribution Module (SKDM), first introduced in FIG. 1, in more detail.

FIG. 2 is a block diagram of SKDM 116, first introduced in FIG. 1, in more detail. SKDM 116 includes an input/output (I/O) module 140, a CRSM 142, a key generation module 144, an encryption module 146, a decryption module 148 and a graphical user interface (GUI) module 150. For the sake of the following examples, SKDM 116 is assumed to execute on CPU 106 of master node 101 (FIG. 1) and be stored in CRSM 114 (FIG. 1). As explained above in conjunction with FIG. 1, a copy of SKDM 116 would typically also be stored and executed on other nodes such as nodes 102-104 (FIG. 1). It should be understood that the claimed subject matter can be implemented in many types of computing systems and data storage structures but, for the sake of simplicity, is described only in terms of master node 101 and cluster 100 (FIG. 1). Further, the representation of SKDM 116 in FIG. 2 is a logical model. In other words, components 140, 142, 144, 146 and 148 may be stored in the same or separates files and loaded and/or executed within cluster 100 either as a single system or as separate processes interacting via any available inter process communication (IPC) techniques.

I/O module 140 handles any communication SKDM 116 has with other components of cluster 100. CRSM 142 is a data repository for information, including information on cluster 100 and associated components such as nodes 101-104, which SKDM 116 may require during normal operation. Examples of the types of information stored in CRSM 142 include cluster data 152, public keys 154, SKDM configuration data 156 and working data 158. Cluster data 152 stores information regarding all that are currently a member of cluster 100, including in this example, nodes 101-104. Public keys 154 stores the public keys associated with each of nodes 101-104 and well as the private key of the corresponding node. Those with skill in the relevant arts will appreciate how the public and private keys stored in conjunction with public keys 154 enable secure communication between SKDM 116 and each of nodes 101-104.

SKDM configuration 156 includes information on various administrative preferences that have been set with respect to SKDM 116. Examples of an administrative functions include, but are not limited to, specification of a particular procedure for ordering nodes (see FIG. 3), a time value used to calculate an "N" value corresponding to each node (see FIG. 3) and a time interval corresponding to how often security keys employed by the nodes in cluster 100 are updated (see FIG. 4). Working data 158 stores information related to ongoing operations of SKDM 116 including intermediate processing.

Key generation module 144 periodically generates a new symmetric key for use by nodes 101-104 within cluster 100. Encryption module 146 employs public keys corresponding to each node 101-104 stored in public key list 152 to encrypt the symmetric keys generated by key generation module 144. Decryption module 148 decrypts an encrypted symmetric key by employing a private key corresponding to the particular node's public key. GUI component 150 enables administrators of SKDM 116 to interact with and define the desired functionality of SKDM 116, typically by modifying parameters in SKDM configuration 156. Components 142, 144, 146, 148, 150, 152, 154, 156 and 158 are described in more detail below in conjunction with FIGS. 3-5.

Figure 3:
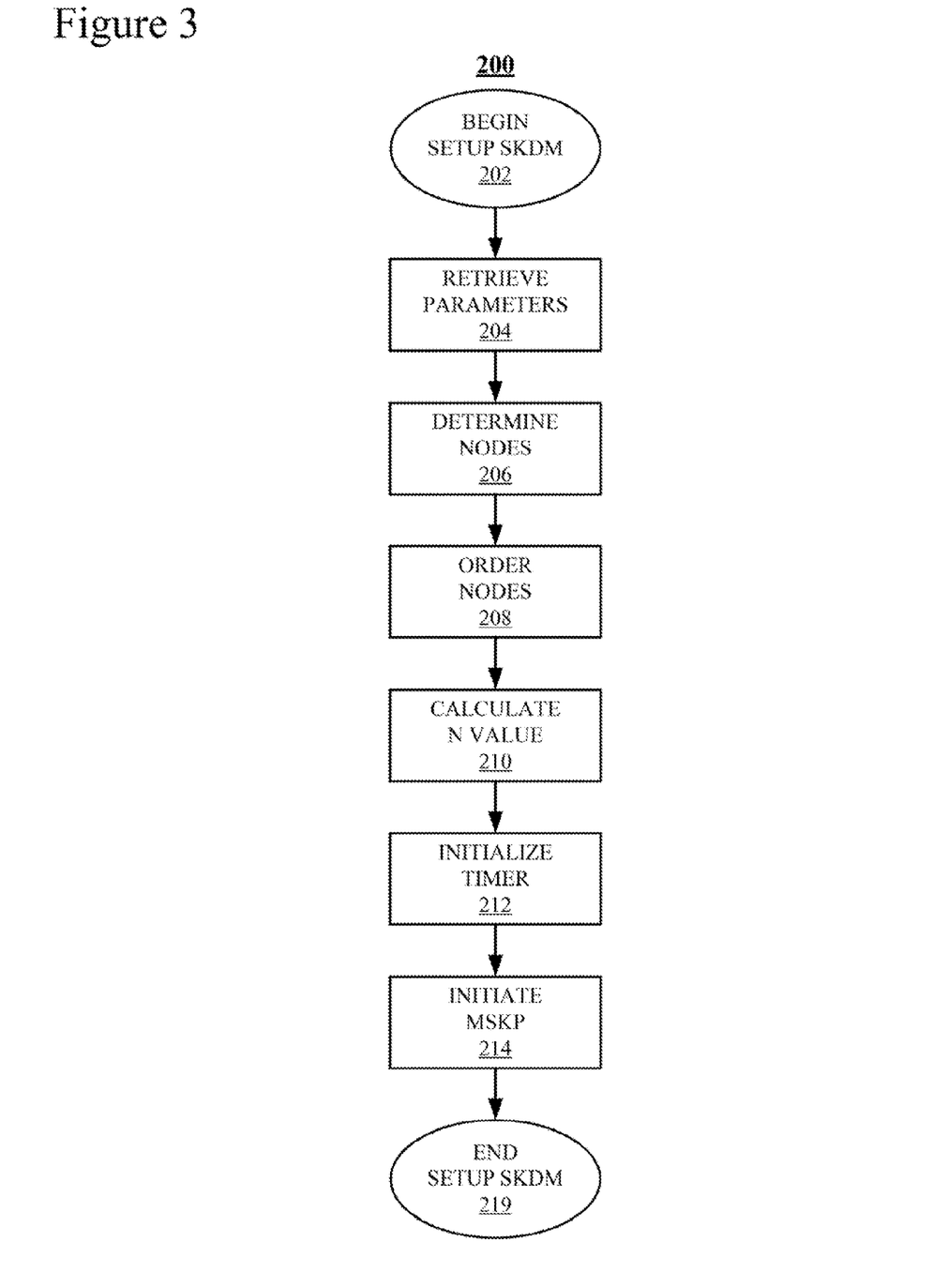
FIG. 3 is a flowchart of an example of a Setup Secure Key Distribution process that may implement aspects of the claimed subject matter.

FIG. 3 is a flowchart of an example of a Setup Secure Key Distribution process 200 that may implement aspects of the claimed subject matter. In this example, logic associated with process 200 is stored on CRSM 114 (FIG. 1) as part of SKDM 116 (FIGS. 1 and 2) and executed on processor 106 (FIG. 1). As explained above in conjunction with FIG. 1, a SKDM like SKDM 116, as well as process 200, may be deployed on other nodes such as nodes 102-104 (FIG. 1) of cluster 100 (FIG. 1).

Process 200 starts in a "Begin Setup SKDM" block 202 and proceeds immediately to a "Retrieve Parameters" block 204. During processing associated with block 204, parameters stored in CRSM 142 (FIG. 2) are retrieved for processing. During processing associated with "Determine Nodes" block 206, information retrieved during processing associated with block 204, specifically the data stored in cluster data 152 (FIG. 2) is parsed to determine the other nodes currently active in cluster 100. In the alternative, SKDM 116 may implement a signaling process to discover other active nodes in cluster 100.

During processing associated with an "Order Nodes" block 208, the active nodes discovered during processing associated with block 206 are assigned an order. In the following examples, the nodes 101-104 are assigned the order 1-4, respectively. The order may be set based upon any number of schemes including, but not limited to, based upon the IP addresses of the nodes, assigned by a communication cluster daemon (clcomd) (not shown) and stored in cluster repository 104 and an order generated by a Make or Create cluster command (mkcluster) (not shown). It should be noted that the ordering and storing of the order of the nodes is typically implemented as an atomic operation.

During processing associated with a "Calculate N Value" block 210, each node with an executing SKDM determines a time value that corresponds to the node's corresponding order number as determined by processing associated with block 208. This N value determines the value of a timer set during processing associated with an "Initialize Timer" block 212. As explained above in conjunction with FIG. 2, information retrieved from SKDM configuration 156 (FIG. 2) includes a time interval corresponding to how often security keys employed by the nodes in cluster 100 are updated. Each node 101-104 that executes a copy of SKDM 116 multiplies their particular N value by the time interval assigned to N values and adds the product to the time interval corresponding to how often security keys employed by the nodes in cluster 100 are updated. In this manner, each node 101-104 employs a timer to a value that corresponds to the particular node. For example, if the symmetric key is updated every sixty (60) seconds and each N value corresponds to ten (10) seconds, node_1 101 would have a timer set to seventy (70) seconds, node_2 102 would have a timer set to eighty (80) seconds, node_3 103 would have a timer set to ninety (90) seconds and node_4 104 would have a timer set to one hundred (100) seconds. The use of these timers is explained in more detail below in conjunction with FIGS. 4 and 5.

During processing associated with an "Initiate MSKP" block 214, a Manage Secure Keys process 250 (see FIG. 4) is initiated. Finally, control proceeds to an "End Setup SKDM" block 219 in which process 200 is complete.

Figure 4:
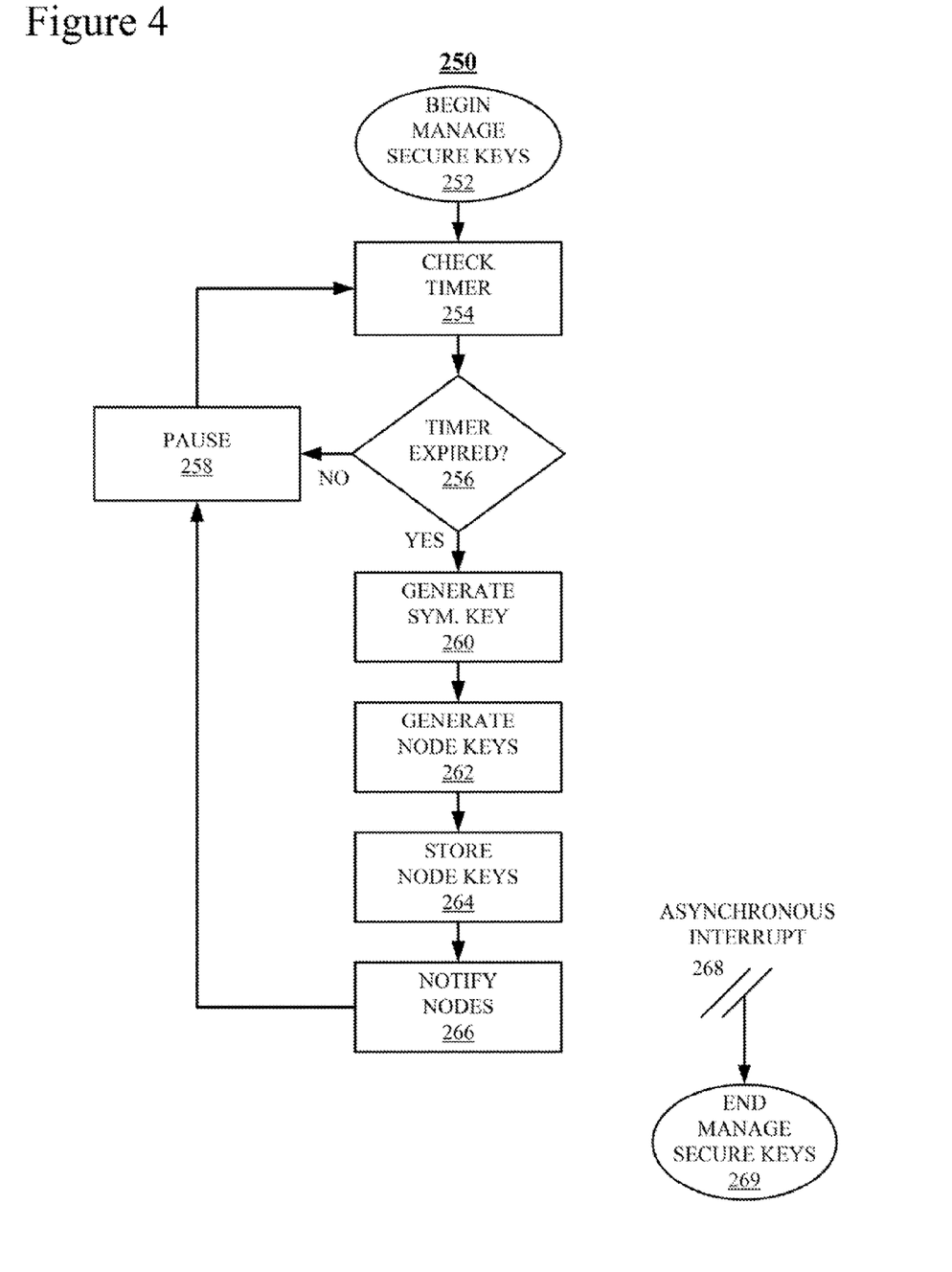
FIG. 4 is a flowchart of an example of a Manage Secure Keys process that may implement aspects of the claimed subject matter.

FIG. 4 is a flowchart of an example of a Manage Secure Keys process 250 that may implement aspects of the claimed subject matter. Like process 200 (FIG. 3), in this example, logic associated with process 250 is stored on CRSM 114 (FIG. 1) as part of SKDM 116 (FIGS. 1 and 2) and executed on processor 106 (FIG. 1). As explained above in conjunction with FIG. 1, a SKDM like SKDM 116, as well as process 250, may also be deployed on other nodes such as nodes 102-104 (FIG. 1) of cluster 100 (FIG. 1).

Process 250 starts in a "Begin Manage Secure Keys" block 222 and proceeds immediately to a "Check Timer" block 254. During processing associated with block 254, a timer (see 212, FIG. 3) associated with the period between the updating of a symmetric key is checked. During processing associated with a "Timer Expired?" block 256, a determination is made as to whether or not the time checked during processing associated with block 254 has expired. If not, control proceeds to a "Pause" block 258 and a period of time is allowed to expire before control returns to block 254 and processing continues as described above.

If, during processing associated with block 256, it is determined that the timer has expired, control proceeds to a "Generate Symmetric (Sym.) Key" block 260. During processing associated with block 260, a new symmetric key for communication among cluster 100 is generated. During processing associated with a "Generate Node Keys" block 262, the symmetric key generated during processing associated with block 260 is encrypted (see 144, FIG. 2) with each of the public keys (see 154, FIG. 2) corresponding to each of the nodes 101-104. During a "Store Node Keys" block 264, the encrypted symmetric keys generated during processing associated with block 262 are stored in a CRSM, which in this example is key repository (rep.) 124 (FIG. 1) of CRSM 122 (FIG. 1) coupled to cluster repository 104 (FIG. 1).

During processing associated with a "Notify Nodes" block 266, the nodes 101-104 are notified of the new symmetric key. Each of nodes 101-104 implements a procedure to retrieve the new symmetric key (see 300, FIG. 5). Once processing associated with block 266 has completed control proceeds to Pause 258 and processing continued as described above. Finally, process 250 is halted by means of an asynchronous interrupt 268, which passes control to an "End Manage Secure Keys" block 269 in which process 250 is complete. Interrupt 268 is typically generated when the OS, application, etc. of which process 250 is part is itself halted. During normal operation, process 250 continuously loops through the blocks 254, 256, 258, 260, 262, 264 and 266.

Figure 5:
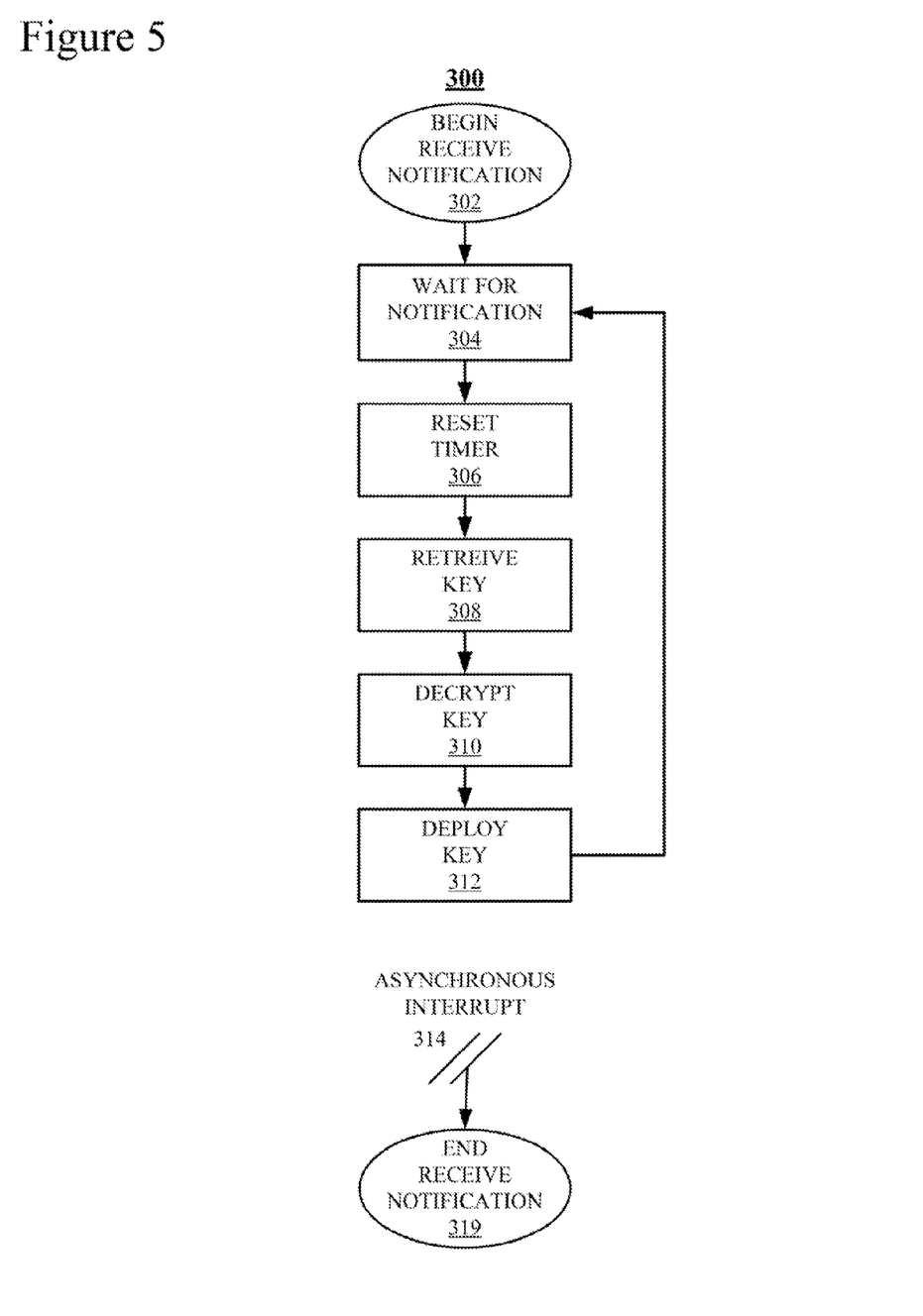
FIG. 5 is a flow chart of a "Receive Notification" process that implements aspects of the claimed subject matter.

FIG. 5 is a flow chart of a "Receive Notification" process 300 that implements aspects of the claimed subject matter. Typically, process 300 executes on each of nodes 101-104 (FIG. 1) as part of a corresponding SKDM such as SKDM 116 (FIGS. 1 and 2) and is stored in a CRSM on the corresponding node 101-104.

Process 300 starts in a "Begin Receive Notification" block 302 and proceeds immediately to a "Wait for Notification" block 304. During processing associated with block 304, process 300 is paused waiting for a notification of that a new symmetric key for node 100 (FIG. 1) has been generated (see 260 and 266, FIG. 4). Once such notification has been received, control proceeds to a "Reset Timer" block 306. During processing associated with block 306, the timers associated with each SKDM of nodes 101-104 is reset to the time to which it was initially set (see 212, FIG. 3).

It should be noted that, as explained above in conjunction with FIG. 3, due to the fact that each node has a timer set to a different interval, typically only one node will periodically generate a new symmetric key. Using the example from FIG. 3 in which the timers of the master node 101, node_2 102, node_3 103 and node_4 104 are set to seventy (70), eighty (80), ninety (90) and one hundred (100) seconds, respectively, the timer of the master node 101 expires and master node 101 generates a new symmetric key (see 260, FIG. 4). Before the timers of the other nodes 102-104 expire, master node notifies nodes 102-104 that a new symmetric key is available (see 266, FIG. 3) and each of nodes 102-104 resets their corresponding timer. In this manner, node_2 102 would generate a new symmetric key when node_1 101 has failed to do so, perhaps because node_1 101 is offline or otherwise unavailable; node_3 103 would generate a new symmetric key when node_1 101 and node_2 102 have failed to do so, and so on.

During processing associated with a "Retrieve Key" block 308, each of nodes 101-104 retrieves the newly generated symmetric key, encrypted with the node's public key (see 264, FIG. 4) from storage, which in the example is key repository 124 (FIG. 1) on CRSM 122 (FIG. 1) of cluster repository 104 (FIG. 1). In other words, each node retrieves a version of the new symmetric key that has been encrypted with the nodes public key. Of course, the particular node 101-104 that generated the symmetric key may not have to retrieve the key. In the alternative, the particular node 101-104 that generates the key may transmit the key in conjunction with the notification, thereby eliminating the need for the other nodes to retrieve the key.

During processing associated with a "Decrypt Key" block 310, each node 101-104 processes the version of the encrypted symmetric key that was retrieved during processing associated with block 308 using the particular node's private key. During processing associated with a "Deploy Key 212, each node begins to use the decrypted symmetric key for communication among the nodes of cluster 100. Finally, process 300 is halted by means of an asynchronous interrupt 314, which passes control to an "End Receive Notification" block 319 in which process 300 is complete. Interrupt 314 is typically generated when the OS, application, etc. of which process 300 is part is itself halted. During normal operation, process 300 continuously loops through the blocks 304, 306, 308, 310 and 312 processing notifications of new symmetric keys as they are transmitted and received.

Figure 6:
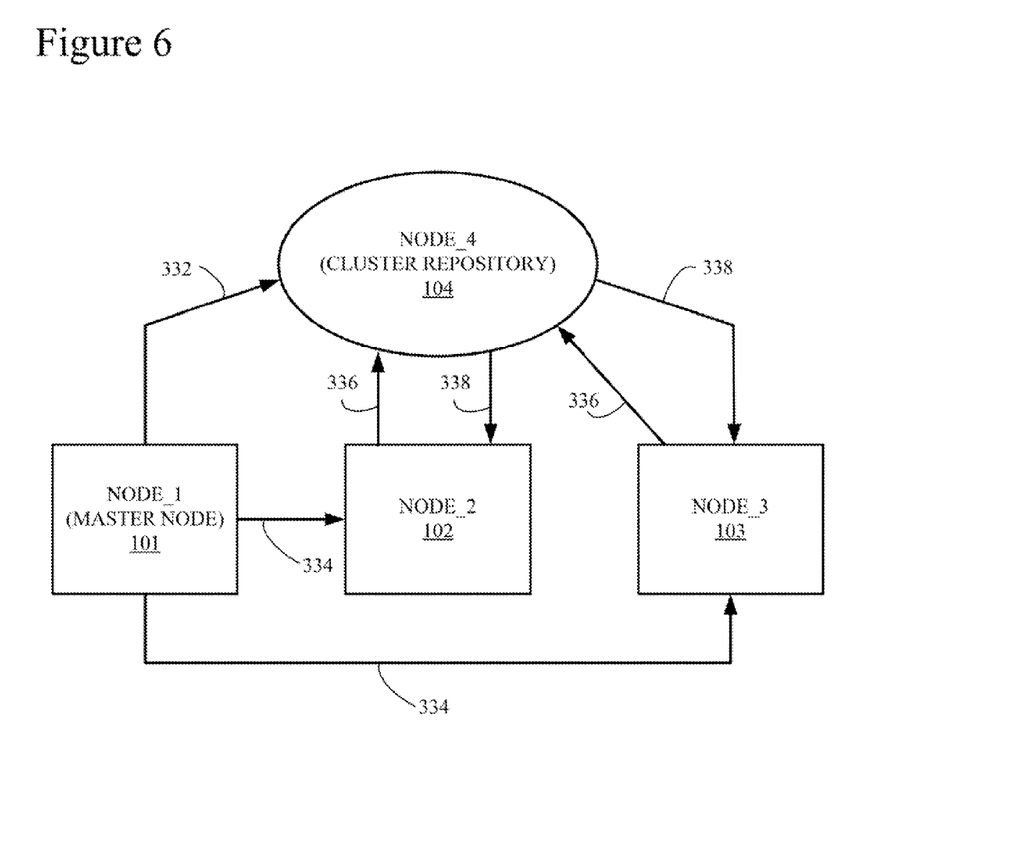
FIG. 6 is a block diagram illustrating one example of a sequence of events corresponding to an implementation of the claimed subject matter.

FIG. 6 is a block diagram illustrating a summary of a sequence of events corresponding to one implementation of the claimed subject matter. Illustrated are master node 101, node_2 102, node_3 103 and cluster repository 104 (FIG. 1). Once master node 101 has generated a new symmetric key (see 260, FIG. 4) and encrypted the new key into versions for each node (see 262, FIG. 4) the keys are transmitted 332 to cluster repository 104. Mater node then notifies 334 other nodes (see 264, FIG. 4). Notified nodes request 336 their particular encrypted copy of the new symmetric key (see 308, FIG. 5) and cluster repository 104 transmits 338 the appropriate key to each node.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus for secure distribution of encryption keys, comprising:
   a processor:
   a computer-readable storage medium coupled to the processor; and
   logic, stored on the computer-readable storage medium and executed on the processor, for:
      generating a symmetric key for encrypting communication among a plurality of nodes of a cluster of nodes;

encrypting the symmetric key with a plurality of public keys, each public key corresponding to a particular node of the plurality of nodes, to generate a plurality of encrypted symmetric keys;

storing the plurality of encrypted symmetric keys in a central repository; and distributing the plurality of encrypted symmetric keys to the nodes such that each particular node receives an encrypted symmetric key corresponding to a corresponding public key of the particular node, the logic for distributing comprising logic for transmitting to each particular node, in conjunction with a notification of the generating, the corresponding encrypted symmetric key.

2. The apparatus of claim 1, the logic for distributing comprising logic for:

notifying a particular node of the plurality of nodes of the availability of the corresponding encrypted symmetric key in the central repository;

retrieving by the particular node the corresponding encrypted symmetric key from the central repository; and decrypting the corresponding encrypted symmetric key with a corresponding private key.

3. The apparatus of claim 1, the logic further comprising logic for:

setting a timer corresponding to a period of time to wait between two successive generations of the symmetric key;

detecting an expiration of the timer; and initiating the generating, encrypting, storing and distributing upon the detecting of the expiration of the timer.

4. The apparatus of claim 3, the logic further comprising logic for reinitializing the timer upon notification of the generating of a symmetric key.

5. The apparatus of claim 4, wherein the notification is initiated by a node of the plurality of nodes that is different than the node of the plurality of nodes that corresponds to the timer.

6. The apparatus of claim 3, wherein the period of time corresponding to the timer is different than a period of time corresponding to a corresponding plurality of timers corresponding to other nodes of the plurality of nodes.

7. A computer programming product for secure distribution of encryption keys, comprising:

a non-transitory computer-readable storage medium; and logic, stored on the computer-readable storage medium for execution on a processor, for:

generating a symmetric key encrypting communication among a plurality of nodes of a cluster of nodes;

encrypting the symmetric key with a plurality of public keys, each public key corresponding to a particular node of the plurality of nodes, to generate a plurality of encrypted symmetric keys;

storing the plurality of encrypted symmetric keys in a central repository; and distributing the plurality of encrypted symmetric keys to the nodes such that each particular node receives an encrypted symmetric key corresponding to a corresponding public key of the particular node, the logic for distributing comprising logic for transmitting to each particular node, in conjunction with a notification of the generating, the corresponding encrypted symmetric key.

8. The computer programming product of claim 7, the logic for distributing comprising logic for:

notifying a particular node of the plurality of nodes of the availability of the corresponding encrypted symmetric key in the central repository;

retrieving by the particular node the corresponding encrypted symmetric key from the central repository; and decrypting the corresponding encrypted symmetric key with a corresponding private key.

9. The computer programming product of claim 7, the logic further comprising logic for:

setting a timer corresponding to a period of time to wait between two successive generations of the symmetric key;

detecting an expiration of the timer; and initiating the generating, encrypting, storing and distributing upon the detecting of the expiration of the timer.

10. The computer programming product of claim 9, the logic further comprising logic for reinitializing the timer upon notification of a generation of a symmetric key.

11. The computer programming product of claim 10, wherein the notification is initiated by a node of the plurality of nodes that is different than the node of the plurality of nodes that corresponds to the timer.

12. The computer programming product of claim 9, wherein the period of time corresponding to the timer is different than a period of time corresponding to a corresponding plurality of timers corresponding to other nodes of the plurality of nodes.

13. A method for secure distribution of encryption keys, comprising:

generating a symmetric key for encrypting communication among a plurality of nodes of a cluster of nodes;

encrypting the symmetric key with a plurality of public keys, each public key corresponding to a particular node of the plurality of nodes, to generate a plurality of encrypted symmetric keys;

storing the plurality of encrypted symmetric keys in a central repository;

distributing the plurality of encrypted symmetric keys to the nodes such that each particular node receives an encrypted symmetric key corresponding to a corresponding public key of the particular node;

setting a timer corresponding to a period of time to wait between two successive generations of the symmetric key;

detecting an expiration of the timer; and initiating the generating, encrypting, storing and distributing upon the detecting of the expiration of the timer.

14. The method of claim 13, the distributing comprising:

notifying a particular node of the plurality of nodes of the availability of the corresponding encrypted symmetric key in the central repository;

retrieving by the particular node the corresponding encrypted symmetric key from the central repository; and decrypting the corresponding encrypted symmetric key with a corresponding private key.

15. The method of claim 13, the distributing comprising transmitting to each particular node, in conjunction with a notification of the generating, the corresponding encrypted symmetric key.

16. The method of claim 13, further comprising reinitializing the timer upon notification of a generation of a symmetric key.

17. The method of claim 16, wherein the notification is initiated by a node of the plurality of nodes that is different than the node of the plurality of nodes that corresponds to the timer.

18. The method of claim 16, wherein the period of time corresponding to the timer is different than a period of time corresponding to a corresponding plurality of timers corresponding to other nodes of the plurality of nodes.

19. A method, comprising:
  receiving, by a node of a plurality of nodes of a cluster, notification of a generation of an encrypted symmetric key, encrypted with a public key corresponding to the node;
  retrieving the encrypted key from a central repository of the cluster;
  decrypting the encrypted symmetric key using a private key corresponding to the public key;
  employing, by the node, the decrypted symmetric key for communication within the cluster;
  setting a timer corresponding to a period of time to wait between the receiving and a previous receiving of the symmetric key;
  detecting an expiration of the timer; and, upon expiration of the timer,
  generating a new symmetric key for the encryption of communication among the plurality of nodes of a cluster of nodes;
  encrypting the symmetric key with a plurality of public keys, each public key corresponding to a particular node of the plurality of nodes, to generate a plurality of encrypted symmetric keys;
  storing the plurality of encrypted symmetric keys in a central repository; and
  distributing the encrypted symmetric keys to each node of the plurality nodes such that each particular node receives an encrypted symmetric key corresponding to a corresponding public key of the particular node.

20. The method of claim 19, further comprising reinitializing the timer upon notification of the generation.

21. The method of claim 20, wherein the notification is initiated by a node of the plurality of nodes that is different than the node of the plurality of nodes that corresponds to the timer.

* * * * *